United States Patent
Snyder et al.

(10) Patent No.: US 6,745,274 B1
(45) Date of Patent: Jun. 1, 2004

(54) APPARATUS AND METHOD FOR SYNCHRONIZING MULTIPLE ACCESSES TO COMMON RESOURCES

(75) Inventors: Robert D. Snyder, Ouistreham (FR); Dean T. Lindsay, Milpitas, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/558,088

(22) Filed: Apr. 25, 2000

(51) Int. Cl.[7] .......................... G06F 12/00; G06F 9/00; G06F 13/00
(52) U.S. Cl. ....................... 710/240; 710/200; 709/104
(58) Field of Search ................. 710/240, 110, 710/310, 200; 711/155; 712/203; 709/104

(56) References Cited

U.S. PATENT DOCUMENTS

| | | | | |
|---|---|---|---|---|
| 5,050,070 A | * | 9/1991 | Chastain et al. ............ 712/203 |
| 5,430,860 A | * | 7/1995 | Capps, Jr. et al. .......... 711/155 |
| 6,128,677 A | * | 10/2000 | Miller et al. .................. 710/40 |
| 6,170,030 B1 | * | 1/2001 | Bell ............................. 710/30 |
| 6,237,019 B1 | * | 5/2001 | Ault et al. ................... 709/104 |
| 6,446,149 B1 | * | 9/2002 | Moriarty et al. ............ 710/110 |

\* cited by examiner

Primary Examiner—Tim Vo
(74) Attorney, Agent, or Firm—Clare T. Hartmele

(57) ABSTRACT

A method and apparatus for providing a synchronization mechanism to control accesses to a non-cached shared resource by devices connected by a high speed interconnect is herein described. A semaphore is used to control access to a shared resource which is implemented by a pair of semaphore registers. A previous semaphore register is used to store the previous owner of the semaphore and a current semaphore register is used to either store the current owner of the semaphore or indicate that the semaphore is available. The current semaphore register is updated when the semaphore is available and is being taken or when the semaphore is being freed. The previous semaphore register is updated when the semaphore is freed.

6 Claims, 6 Drawing Sheets

APPARATUS AND METHOD FOR SYNCHRONIZING MULTIPLE ACCESSES TO COMMON RESOURCES

FIELD OF THE INVENTION

The present invention relates generally to computer systems. More particularly, the invention relates to a mechanism for synchronizing access to common resources.

BACKGROUND OF THE INVENTION

An important requirement for a multiprocessor computer system is for multiple devices to be able to share a common resource. Typically, a synchronization mechanism is used to coordinate multiple accesses for the shared resource in order to ensure that one device obtains the shared resource at a given time.

An example of such a synchronization mechanism is an atomic instruction, such as a test-and-set instruction or a read-modify-write instruction. The atomic instruction operates on a lock variable or semaphore that represents the shared resource. Only one device is able to obtain access to the lock variable at a time thereby synchronizing access to the shared resource. Often, a device wants to write a value into the lock variable once it obtains access to it. The atomic instruction allows the device to both read the value of the lock variable and to write another value to the lock variable at the same time.

Atomic instructions are typically imp lemented using a bus lock mechanism or a cache coherency mechanism. In the bus lock mechanism, the bus is the only path to the memory location of the lock variable. A device obtains exclusive access to the bus thereby locking out all other devices to the memory location of the lock variable.

A cache coherency mechanism ensures that the contents of a particular memory location stored in any cache and in main memory remain coherent. In one such cache coherency mechanism, a protocol is used that updates the lock variable in one location in response to changes made to the lock variable in a second location. In another cache concurrency mechanism, another protocol is used that associates status tags with the lock variable that reflect the staleness of the lock variable when a copy of the lock variable is contained elsewhere. In this manner, a device is prevented from reading a copy of the lock variable that does not reflect its current value.

In some multiprocessor computer systems, a bus lock mechanism or a cache coherency mechanism may not be feasible. The shared resource and a device contending for the shared resource may not be connected by a common bus. In addition, the shared resource may not be cached thereby not subject to a cache coherency mechanism. For these types of computer systems, there is a need for a synchronization mechanism that can ensure atomic access to the shared resource.

SUMMARY OF THE INVENTION

In summary, the technology of the present invention pertains to a synchronization mechanism that controls multiple accesses to a shared resource. In an embodiment of the invention, a multiprocessor computer system embodying the synchronization mechanism has several processors coupled to a memory and I/O system that form a cell. The cells are coupled to each other through an interconnect such as a cross bar switch. The interconnect contains a number of shared resources, such as control and status registers, that can be accessed by any processor in order to initialize the routing information stored in the interconnect. These shared resources are non-cacheable by the processors.

In particular, when the computer system is powered on, any of the processors can initialize the routing information of the interconnect instead of relying on a dedicated processor to perform the task. In this manner, the interconnect will be initialized even in the event of a failure to any one of the processors. However, this benefit presents the problem of having multiple processors access the shared non-cacheable resource. Hence, the need for a synchronization mechanism to coordinate these accesses.

The interconnect includes a synchronization mechanism that utilizes a semaphore to control access to the shared resources. The synchronization mechanism includes a transaction control unit and a semaphore control unit. The transaction control unit serializes requests for access to the semaphore. The semaphore control unit initiates access to the semaphore. The semaphore is implemented by a pair of semaphore registers. A previous semaphore register is used to store the previous owner of the semaphore and a current semaphore register is used to either store the current owner of the semaphore or indicate that the semaphore is available.

A device, such as a processor, obtains access to a shared resource by making a request to write its unique identifier into the current semaphore register. When access is granted to the device, the device's unique identifier is written into the current semaphore register. In order to determine if the device has obtained the shared resource, the device makes a subsequent request to read the contents of the current semaphore register . If the contents of the current semaphore register are the same as the device's unique identifier then the device has successfully obtained access to the shared resource. Otherwise, the device has not yet received access to the shared resource and makes a subsequent request to obtain the semaphore.

To release access to a shared resource, the device having locked the semaphore writes a predefined unlock value into the current semaphore register. In the case where the device having locked the semaphore fails or is non-operational, an error handling mechanism can write the unlock value into the current semaphore register thereby unlocking the semaphore. When the semaphore is freed, the previous value of the semaphore is stored into the previous semaphore register.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
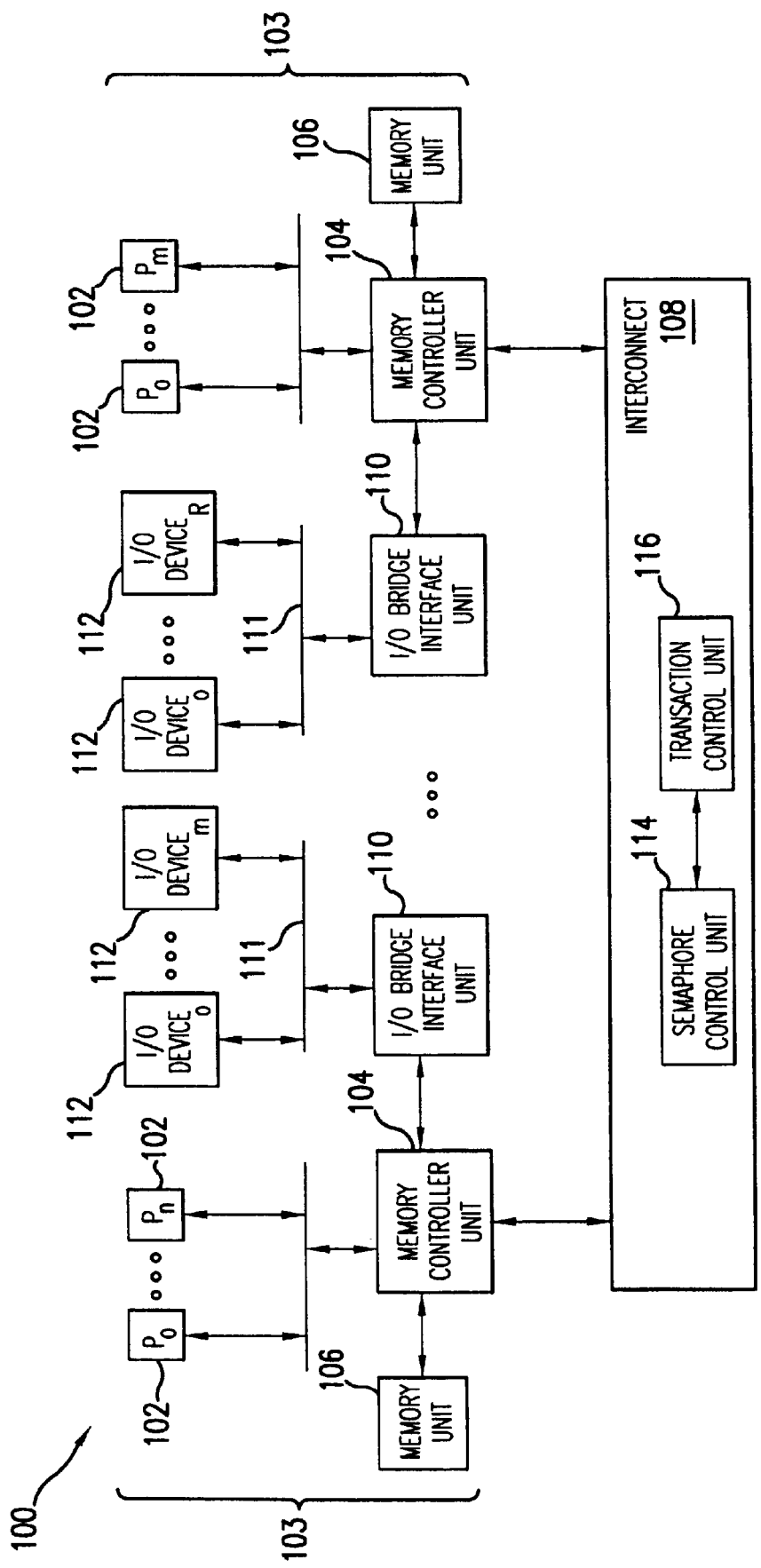
FIG. 1 is a schematic view of an exemplary computer system in accordance with an embodiment of the present invention.

FIG. 1 illustrates an exemplary computer system 100 embodying the technology of the present invention. There is shown a number of processors 102, memory controller units 104, memory units 106, an interconnect 108, an I/O bridge interface unit 110, and several I/O devices 112.

A number of the processors 102 are grouped into clusters and connected to a particular memory controller unit 104 that is coupled to a memory unit 106. An I/O bridge interface unit 110 coupled to a number of I/O devices 112 is also connected to the memory controller unit 104. The collection of clustered processors 102 and coupled memory controller unit 104, memory unit 106, I/O bridge interface unit 110, and I/O devices 112 form a cell 103. The computer system can have any number of cells 103, each of which are coupled to a common interconnect 108.

The processors 102 can be any type of processor or central processing unit ("CPU"), such as but not limited to, microprocessors and the like. Examples of such microprocessors include, but are not limited to, the Hewlett-Packard ("HP") PA-RISC family of microprocessors, the Intel family of IA-32 and IA-64 microprocessors, and the like.

The memory controller unit 104 coordinates accesses to the memory unit 106 from any of the processors 102 and the I/O devices 112. The memory unit 106 can be any type of memory device or combination thereof such as, but not limited to, flash memory, DRAM, SRAM, RAM, or the like. In addition, each processor 102 can include a cache memory (not shown) having data that is shared by any of the other processors 102.

The I/O bridge interface unit 110 is coupled to the memory controller unit 104 and to a number of I/O devices 112. The I/O devices 112 can be any type of peripheral device, including but not limited to, host bus adapters, bus bridges, graphics adapter, printers, audio peripherals, motion video peripherals, and the like. Preferably, the I/O devices 112 are connected through the Peripheral Component Interconnect ("PCI") bus 111.

The cells 103 are coupled through the interconnect 108. The interconnect 108 is a high speed interconnect such as but not limited to, a network, a point-to-point link, crossbar switch, or the like. The interconnect is not a shared bus communication link. Preferably, a crossbar switch is used.

The interconnect 108 includes a number of resources that are shared amongst the various processors 102. Examples of these shared resources include control and status registers that any of the processors 102 can access in order to set routing information in the interconnect 108. In particular, when the computer system 100 is powered on, any of the processors 102 are able to initialize the routing information of the interconnect 108. This is beneficial in the case of a processor failure since it does not rely on a dedicated processor 102 to perform the task. In this manner, the interconnect will be initialized even in the event of a failure to any one of the processors 102. However, it presents the problem of having multiple processors 102 access the control and status registers.

The interconnect 108 includes a semaphore control unit 114 and a transaction control unit 116 that are used to synchronize access to these shared resources. The shared resources are memory-mapped registers whose contents are not cached by any of the other devices.

The transaction control unit 116 services incoming transactions. The interconnect 108 has a number of ports through which transactions or requests are received. The transaction control unit 116 polls each port in a predefined manner in order to act upon these incoming transactions serially. These incoming transactions can include requests to access a shared resource.

The foregoing discussion has described an exemplary computer system 100 that embodies the technology of the present invention. Attention now turns to a brief description of the operation of the synchronization mechanism.

Each device, such as the processors 102, memory controller units 104, I/O bridge interface unit 110, or I/O devices 112, can access a shared resource within the interconnect 108. Each shared resource has a semaphore that is represented by a pair of semaphore registers 156, 158. There is a previous semaphore register 158 (see FIG. 5) that contains a unique value identifying the previous owner of the shared resource and a current semaphore register 156 (see FIG. 5) that stores a value representing the owner having access to the shared resource. Initially, there is a unique value placed in the previous and current semaphore registers 156, 158 that indicates that the shared resource is available (i.e., unlocked).

Figure 2:
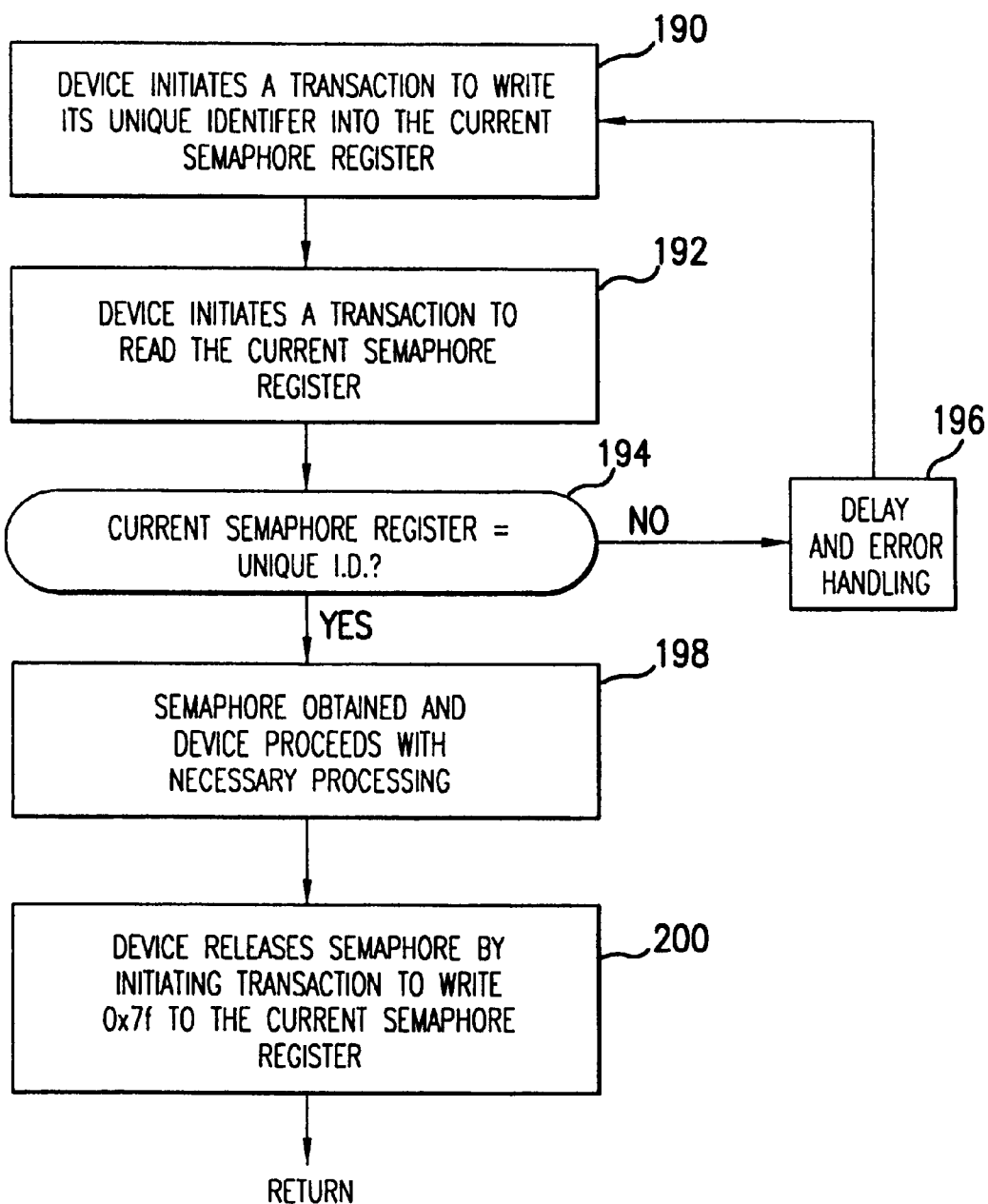
FIG. 2 is a block diagram illustrating the steps used by a device to access a shared resource.

Referring to FIG. 2, a device obtains access to the shared resource by making a request to write its unique identifier into the current semaphore register 156 (step 190). When access is granted to the device, the device's unique identifier is written into the current semaphore register 156. In order to determine if the device has obtained the shared resource, the device makes a subsequent request to read the contents of the current semaphore register 156 (step 192). If the contents of the current semaphore register 156 are the same as the device's unique identifier (step 194-YES), then the device has successfully obtained access to the shared resource and proceeds with its processing (step 198). Otherwise (step 194-NO), the device has not received access to the shared resource and makes a subsequent request to obtain the semaphore (step 190).

To release access to a shared resource, the device having locked the semaphore writes a predefined unlock value into the current semaphore register 156 (step 200). In the case where the device having locked the semaphore fails or is nonoperational, an error handling mechanism can write the unlock value into the current semaphore register 156 thereby unlocking the semaphore (step 196). Whenever the semaphore is freed, the value 122 of the semaphore is stored into the previous semaphore register 158.

Figure 3:
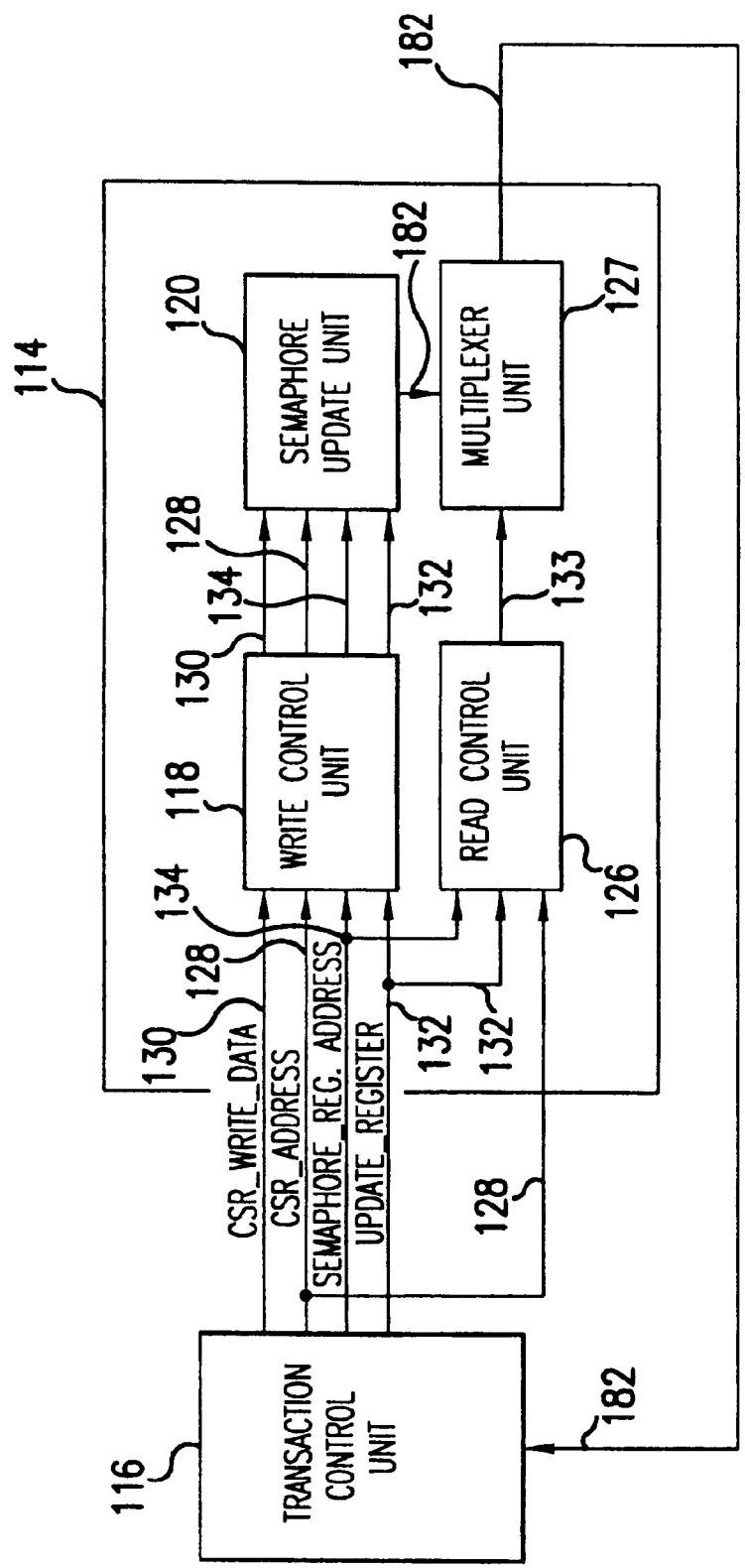
FIG. 3 illustrates the semaphore control unit shown in FIG. 1.

A more detailed discussion of the synchronization mechanism is described below. FIG. 3 illustrates the transaction control unit 116 and the components of the semaphore control unit 114. The transaction control unit 116 receives requests or transactions to access the previous and current semaphore registers 158, 156. There are two types of requests: a read request; and a write request. The read request returns the values of both the previous and current semaphore owners. A write request can be used to either free the semaphore by writing the value 0x7F into the current semaphore register 156 or to obtain access to the semaphore by writing the device's unique identifier into the current semaphore register 156.

The transaction that contains these requests can contain the following fields: CSR_address 128; CSR_write_data 130; and update_register 132. The CSR_address field 128 represents the address of the semaphore registers 156, 158. The previous and current semaphore registers 156, 158 have the same memory address which is denoted as semaphore_reg_address 134. The CSR_write_data field 130 contains the data that will be written into the current semaphore register 156 which is either the unlock value, 0x7F, or the unique identifier of the device requesting access to the semaphore. The update_register field 132 indicates the type of access required. When the update_register field is set to '1'b, it indicates a write request to write to the current semaphore register 156 and when the update_register field is set to a '0'b, it indicates a read request to read from the previous and current semaphore registers 156, 158.

In the case of a write request to obtain access to the shared resource, the transaction will contain the address of the semaphore 156, 158 (i.e., CSR_address=semaphore_reg_address), the identifier of the device seeking the semaphore (i.e., CSR_write_data≠0x7F), and an indicator specifying that the request is to write to the semaphore (i.e., update_register='1'b). For a write request to unlock the semaphore, the transaction will contain the address of the semaphore register 156, 158 (i.e., CSR_address=semaphore_reg_address), the unlock value (i.e., CSR_write_data=0x7F), and an indicator specifying that the request is to write to the semaphore (i.e., update_register='1'b). In the case of a read request, the transaction will contain the address of the semaphore register 156, 158 (i.e., CSR_address=semaphore_reg_address), any data on CSR_write_data (the value is not used), and an indicator specifying that the request is to read the semaphore (i.e., update_register='0'b).

The semaphore control unit 114 receives input signals from the transaction control unit 116 that originate from the read and write requests. The output signal of the semaphore control unit 114 is a semaphore signal 182 that contains the contents of both the previous and current semaphore registers 156, 158.

The semaphore control unit 114 includes a write control unit 118, a read control unit 126, a semaphore update unit 120, and a multiplexer unit 127. The write control unit 118 processes the write requests and the read control unit 126 processes the read requests. The semaphore update unit 120 updates the current and previous semaphore registers 156, 158 and generates the semaphore signal 182. The multiplexer unit 127 outputs the semaphore signal 182 in the case of a read request.

The write control unit 118 receives the following inputs which were described above: CSR_write_data 130; CSR_address 128; semaphore_reg_address 134; and update_register 132. When the update_register signal 132 indicates a write request, the write control unit 118 transmits these input signals to the semaphore update unit 120. The semaphore update unit 120 updates the previous and current semaphore registers 156, 158 in accordance with these inputs and this will be described in more detail below.

The read control unit 126 receives the update_register signal 132, the semaphore_reg_address signal 134, and the CSR_address signal 128. When the update_register signal 132 indicates a read request (i.e., update_register='0'b) and the CSR_address signal 128 indicates the address, semaphore_reg_address 134, the read control unit 126 sets the select signal 133 of the multiplexer unit 127 to output the semaphore signal 182. The multiplexer unit 127 can receive inputs from other units which are not shown. The select signal 133 is used to select the semaphore signal 182 upon demand.

Figure 4:
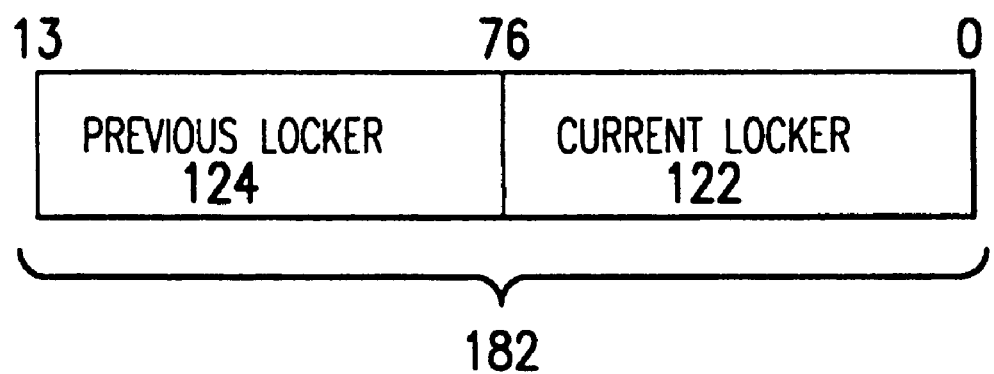
FIG. 4 illustrates an exemplary layout of the semaphore signal.

FIG. 4 illustrates an exemplary layout of the semaphore signal 182 that contains the contents of the previous and current semaphore registers 156, 158. The signal 182 contains two values: current locker 122; and previous locker 124. Current locker 122 identifies either that the semaphore is currently free (i.e., unlocked) or indicates that the semaphore is locked. When the current locker field 122 contains the value 0x7F, the semaphore is free. When the current locker field 122 contains any other value than 0x7F, it is locked and the value identifies the device that has access to the shared resource. The previous locker field 124 identifies the previous semaphore owner. It is assumed that each device having access to the semaphore registers 156, 158 has a unique identifier and that the unique identifier is not the unlock value, 0x7F. Furthermore, the previous and current semaphore registers 156, 158 are memory mapped to the same address.

The previous locker field 124 contains the value of the previous owner of the semaphore. This information is useful for debugging or performance monitoring purposes. For example, a performance monitoring mechanism can utilize the value of previous locker in order to determine the access patterns for the semaphore which may be useful in optimizing the performance of the computer system 100.

Figure 5:
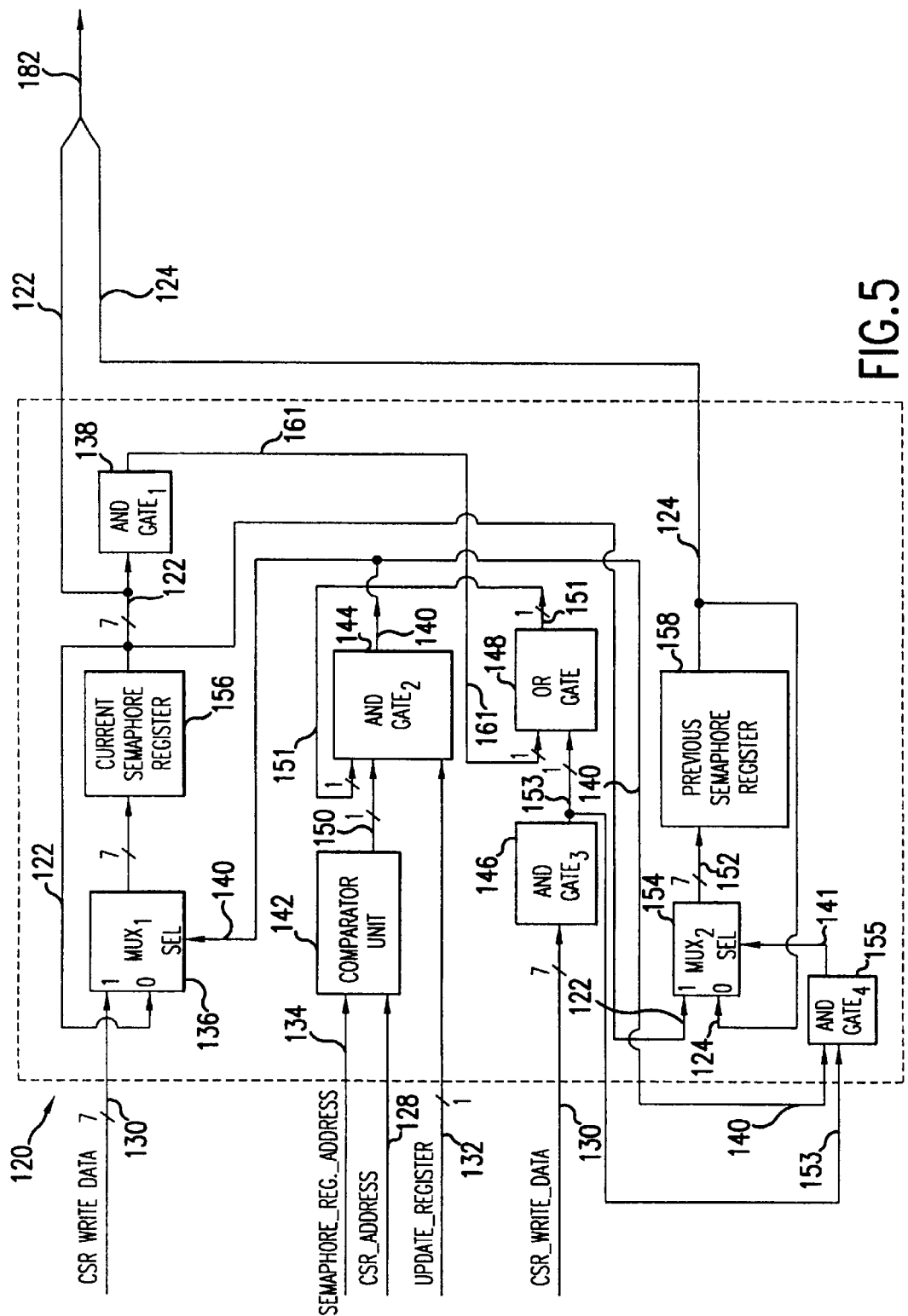
FIG. 5 is a block diagram illustrating the components of the semaphore update unit shown in FIG. 3.

FIG. 5 illustrates the various components of the semaphore update unit 120. The current semaphore register 156 stores the current value of current locker 122. The current semaphore register 156 is coupled to a first multiplexer unit 136 and to a first AND gate 138. The first multiplexer unit 136 selects the data that should be written into the current semaphore register 156. The first multiplexer unit 136 receives the CSR_write_data 130 and the value 122 that is currently stored in the current semaphore register 156. The select signal 140 of the first multiplexer unit 136 is set when the semaphore is unlocked and there is a write request seeking to write to the current semaphore register 156 or when the request is to unlock the semaphore.

The first AND gate 138 is used to indicate the lock status of the semaphore based on the contents of the current semaphore register 156. The content 122 of the current semaphore register 156 is coupled to the first AND gate 138. When the current semaphore register 156 is set to 0x7F, the output of the first AND gate 138 is set high (i.e., high='1'b). For all other values, the output of the first AND gate 138 is set low (i.e., low='0'b). The output of the first AND gate 138 is then used to control the first multiplexer select signal 140.

The first multiplexer select signal 140 is controlled by the outputs of several logic units including a comparator unit 142, a second AND gate 144, a third AND gate 146, and an OR gate 148. The second AND gate 144 sets the first multiplexer select signal 140 when the transaction is a write request to the semaphore register's address (i.e., update_register='1'b and CSR_address=semaphore_reg_address), and either when the semaphore is unlocked (i.e., output of first AND gate 138 is set) or where there is a write request to unlock the semaphore (i.e., CSR_write_data=0x7F). The manner in which each of these signals is set is discussed in turn below.

The comparator unit 142 is coupled to the second AND gate 144. The comparator unit 142 receives CSR_address 128 and semaphore_reg_address 134. When both of these addresses 128, 134 are identical, the output signal 150 of the comparator unit 142 is set high and is transmitted to the second AND gate 144.

The second AND gate 144 also receives the output signal 151 of the OR gate 148. The output signal 151 of the OR gate 148 is set when either the semaphore is available or when the request is to unlock the semaphore. The OR gate 148 receives output signals 161, 153 from the first AND gate 138 and the third AND gate 146 respectively. The output signal 161 of the first AND gate 138 is set when the content of the write register 156 is 0x7F thereby indicating that the semaphore is available. The output signal 153 of the third AND gate 146 is set when the CSR_write_data 130 is 0x7F thereby indicating that the request is to unlock the semaphore.

In addition, the second AND gate 144 receives the update_register signal 132 which is set high when the request is to write to the semaphore. When all three inputs are set high, the second AND gate 144 activates the first multiplexer select signal 140 to write the contents of CSR_write_data 130 into the current semaphore register 156. Attention now turns to the operation of the previous semaphore register 158.

The previous semaphore register 158 is provided to store the value of the previous locker field 124. This is done whenever the semaphore is freed. The previous semaphore register 158 is coupled to the output 152 of a second multiplexer unit 154. The second multiplexer unit 154 is used to select the value that will be stored in the previous semaphore register 158. The second multiplexer unit 154 receives the current value 124 stored in the previous semaphore register 158 and the previous value 122 stored in the current semaphore register 156. When the second multiplexer select signal 141 is set, the previous value 122 of the current semaphore register 156 is selected by the second multiplexer unit 154 and stored in the previous semaphore register 158.

The second multiplexer select signal 141 is set when the semaphore is freed. This occurs when a new value is written into the current semaphore register 156 and when that new value is the unlock value, 0x7F. A fourth AND gate 155 sets the second multiplexer select signal 141 when both of these conditions occur (i.e., when the first multiplexer select signal 140 is set and the output 153 of the third AND gate 146 are both set). The first multipelxer select signal 140 is set when there is a pending write request and the output 153 of the third AND gate 146 is set when the unlock value, 0x7F, is being written into the current semaphore register 156. When the second multiplexer select signal 141 is set, the value 122 of the current semaphore register 156 is stored into the previous semaphore register 158.

The output of the semaphore update unit 120 is the semaphore signal 182 which contains both the current locker field 122 and the previous locker field 124. These values can then be read without utilizing the semaphore update unit 120.

The foregoing description described the components and operation of the semaphore control unit 114 which is one aspect of the synchronization mechanism of the present invention. Attention now turns to a discussion of the overall operation of the synchronization mechanism.

Figure 6:
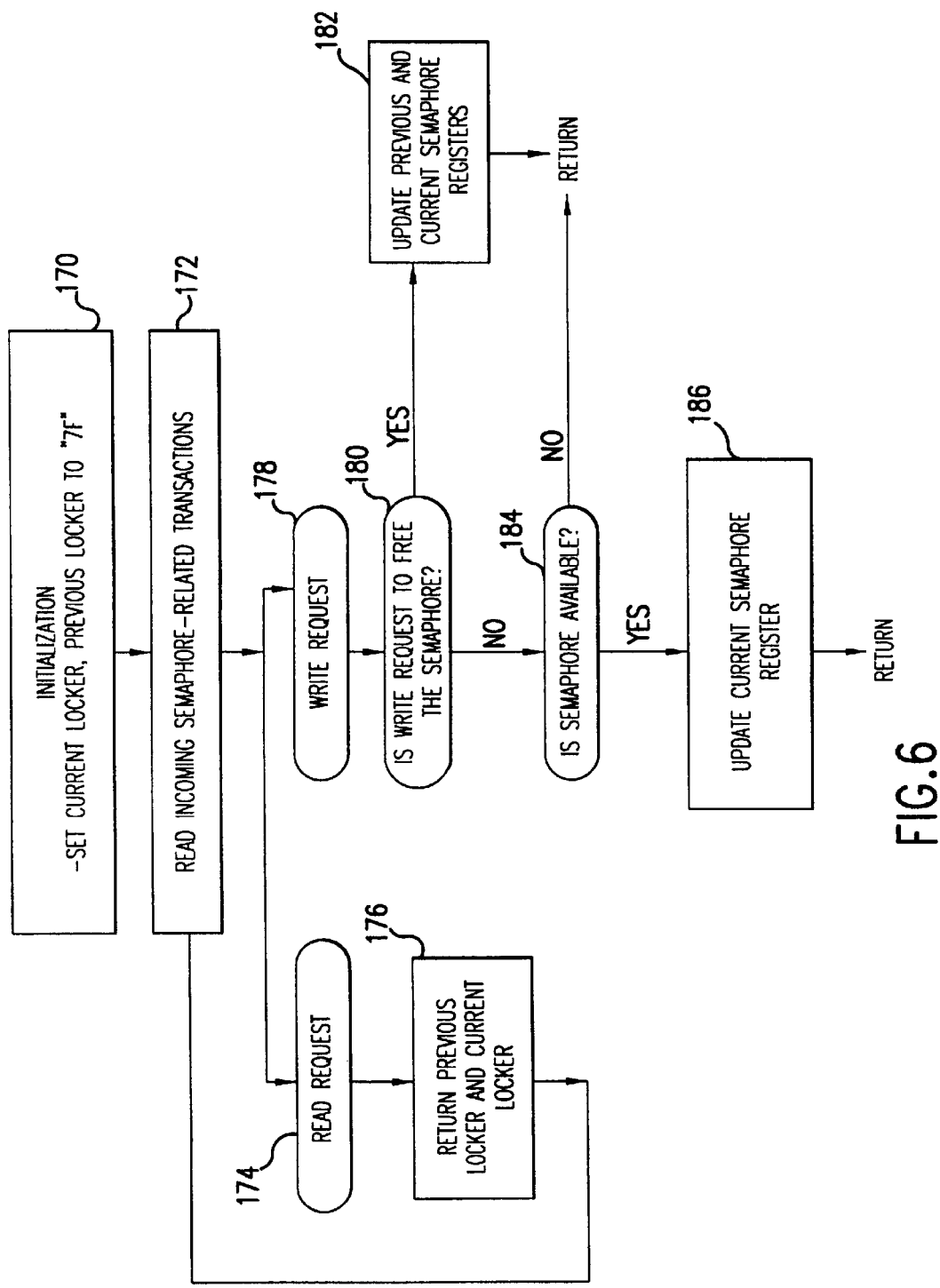
FIG. 6 is a block diagram illustrating the steps used to synchronize access to a shared resource.

The steps illustrated in FIG. 6 summarize the operation of the synchronization mechanism of the present invention. Initially, when the computer system 100 powers on, the previous locker 124 and current locker 122 fields are set to unlock (step 170).

Next the interconnect 108 reads the incoming transactions for requests to access the semaphore registers 156, 158 (step 172). As noted above, the transaction control unit 116 of the interconnect 108 polls each port in a predetermined manner and serially selects a particular transaction to process. The transaction control unit 116 controls access to the semaphore registers 156, 158 by determining the order that the transactions are processed. The transactions can be a read request for the current and previous values of the semaphore or a write request to either unlock the semaphore or to obtain access to the semaphore.

In the case of a read request, the read control unit 126 receives the update_register signal 132 which is set to low (i.e., update_register='0'b) and the CSR_address signal 128 which is set to semaphore_reg_address (step 174). The read control unit 126 sets the select signal 133 of the multiplexer unit 127 to read the semaphore signal 182. The semaphore signal 182 is then returned to the transaction control unit 116 which then returns the desired value to the requesting device (step 176).

In the case of a write request (step 178), the write control unit 118 receives the following input signals and uses them to process the write request: CSR_write_data 130; CSR_address 128, semaphore_reg_address 134; and update_register 132. If the write request is to free the semaphore (step 180-YES), then the previous and current semaphore registers 158, 156 are updated as described above with respect to FIGS. 2–4. If the write request is not to free the semaphore (step 180-NO) but rather to access the semaphore and the semaphore is available (step 184-YES), then the current semaphore register is updated (step 186). Otherwise, if the semaphore is not available (step 184-NO), neither semaphore register 156, 158 is updated. In this case, the requesting device will initiate a read request and determine that the semaphore was not obtained . As a result, the requesting device may reinitiate another write transaction to obtain the semaphore.

The foregoing description has described a synchronization mechanism that controls multiple accesses to a shared resource. The synchronization mechanism is beneficial since it utilizes existing read and write instructions that are part of the computer architecture and does require a special instruction to implement the synchronization control.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

In an alternate embodiment of the present invention, the previous and current semaphore registers can be used to perform a read-modify-write operation. In a readmodify-write operation, the old value of the semaphore is returned while the current value of the semaphore is updated with a new value. One skilled in the art can easily modify the synchronization mechanism described above to have each device write a new value, or an increment to the current value, to the current semaphore register when the semaphore register is available and to update the previous semaphore register each time the current semaphore register is updated.

In yet another embodiment, the technology described herein can be easily modified to do a read and write operation to the semaphore simultaneously. A device can initiate a write request to write a new value into the semaphore. The write request would be satisfied if permitted when the semaphore is either unlocked or being unlocked. The current value is the semaphore is transmitted back to the requesting device regardless of whether the new value was written into the semaphore or not. In this manner, the device initiating the write will not have to initiate another read request to determine if it obtained the semaphore. The current value of the semaphore will be transmitted back to the device initiating the request and the device can make this determination from the current value.

What is claimed is:

1. A computer system comprising:
   a number of cells, each cell including
      a number of processors,
      a memory unit,
      an I/O bridge, and
      a memory controller unit that interconnects the memory unit, the I/O bridge, and the number of processors; and
   a non-bus, high-speed interconnect that interconnects the number of cells, the non-bus, high-speed interconnect including
      a high-speed data transmission medium,
      a number of resources,
      a transaction control unit that serializes access requests made by components of the cells, including the processors, for access to the number of resources and the number of control registers, the transaction control unit comprising
         a number of ports, each port representing a communication medium by which a cell component sends a resource access request, and
         logic that polls the number of ports to receive and serialize access requests from components of the number of cells, and
      a semaphore control unit that interoperates with the transaction control unit to provide exclusive access to each resource, the semaphore control unit comprising, for each resource, an associated pair of semaphore registers including a current owner register and a previous owner register, the current owner register containing one of
         a predefined value indicating that the resource associated with the pair of semaphore registers including the current owner register is available, and
         an identifier identifying a component of a cell currently holding exclusive access to the resource associated with the pair of semaphore registers including the current owner register.

2. A computer system comprising:
   a number of cells, each cell including
      a number of processors,
      a memory unit,
      I/O bridge, and
      a memory controller unit that interconnects the memory unit, the I/O bridge, and the number of processors; and
   a non-bus, high-speed interconnect that interconnects the number of cells, the non-bus, high-speed interconnect including
      a high-speed data transmission medium,
      a number of resources,
      a transaction control unit that serializes access requests made by components of the cells, including the processors, for access to the number of resources and the number of control registers, the transaction control unit comprising
         a number of ports, each port representing a communication medium by which a cell component sends a resource access request, and
         logic that polls the number of ports to receive and serialize access requests from components of the number of cells, and
      a semaphore control unit that interoperates with the transaction control unit to provide exclusive access to each resource, the semaphore control unit comprising, for each resource, an associated pair of semaphore registers including a current owner register and a previous owner register, the previous owner register containing one of
         a predefined value indicating that the resource associated with the pair of semaphore registers including the current owner register was previously available, and
         an identifier identifying a component of a cell that previously held exclusive access to the resource associated with the pair of semaphore registers including the current owner register.

3. A computer system comprising:
   a number of cells, each cell including
      a number of processors,
      a memory unit,
      an I/O bridge, and
      a memory controller unit that interconnects the memory unit, the I/O bridge, and the number of processors; and
   a non-bus, high-speed interconnect that interconnects the number of cells, the non-bus, high-speed interconnect including
      a high-speed data transmission medium,
      a number of resources,
      a transaction control unit that serializes access requests made by components of the cells, including the processors, for access to the number of resources and the number of control registers, access requests including
         read requests, each read request requesting return of the values of the current owner register and the previous owner register associated with a resource, and
         write requests, each write request requesting one of
            writing of a component identifier to the current owner register associated with a resource in order to gain exclusive use of the resource, and
            writing of a predefined value to the current owner register associated with a resource in order to relinquish exclusive use of the resource, and
      a semaphore control unit that interoperates with the transaction control unit to provide exclusive access to each resource.

4. The computer system of claim 3 wherein, upon successful execution of a write request requesting writing of a component identifier to the current owner register associated with a resource in order to gain exclusive use of the resource, the current contents of the current owner register is stored in the previous owner register associated with the resource and the component identifier is stored in the current owner register.

5. A method for providing exclusive access to resources within a non-bus, high-speed interconnect that interconnects cells of a computer system that each includes a number of processors, a memory unit, an I/O bridge, and a memory controller unit that interconnects the memory unit, the I/O bridge, and the number of processors, the method comprising:

providing a transaction control unit that serializes access requests made by components of the cells, including the processors, for access to the number of resources and the number of control registers;

providing a semaphore control unit that interoperates with the transaction control unit to provide exclusive access to each resource, the semaphore control unit comprising, for each resource, an associated pair of semaphore registers including a current owner register and a previous owner register, the current owner register containing one of
        a predefined value indicating that the resource associated with the pair of semaphore registers including the current owner register is available, and
        an identifier identifying a component of a cell currently holding exclusive access to the resource associated with the pair of semaphore registers including the current owner register; and receiving and executing access requests, made by components of the cells, by the transaction control unit, interoperating with the semaphore control unit.

6. A method for providing exclusive access to resources within a non-bus, high-speed interconnect that interconnects cells of a computer system that each includes a number of processors, a memory unit, an I/O bridge, and a memory controller unit that interconnects the memory unit, the I/O bridge, and the number of processors, the method comprising:

providing a transaction control unit that serializes access requests made by components of the cells, including the processors, for access to the number of resources and the number of control registers;

providing a semaphore control unit that interoperates with the transaction control unit to provide exclusive access to each resource, the semaphore control unit comprising, for each resource, an associated pair of semaphore registers including a current owner register and a previous owner register, the previous owner register containing one of
        a predefined value indicating that the resource associated with the pair of semaphore registers including the current owner register was previously available, and
        an identifier identifying a component of a cell that previously held exclusive access to the resource associated with the pair of semaphore registers including the current owner register; and receiving and executing access requests, made by components of the cells, by the transaction control unit, interoperating with the semaphore control unit.

\* \* \* \* \*